United States Patent [19]

Gmeiner

[11] 3,727,977
[45] Apr. 17, 1973

[54] ATTACHMENT OF A SAFETY BELT FOR AN ADJUSTABLE SEAT OF A MOTOR VEHICLE

[75] Inventor: Günter Gmeiner, Sindelfingen, Germany

[73] Assignee: Daimler-Benz Aktiengesellschaft, Stuttgart, Germany

[22] Filed: Mar. 23, 1971

[21] Appl. No.: 127,306

[30] Foreign Application Priority Data

Mar. 24, 1970 Germany..................P 20 14 007.2

[52] U.S. Cl.................................297/344, 297/385
[51] Int. Cl............................A47f 5/00, B60r 21/10
[58] Field of Search......................297/344, 385, 387, 297/216; 248/429

[56] References Cited

UNITED STATES PATENTS

| | | |
|---|---|---|
| 3,186,760 | 6/1965 | Lohr..................................297/385 X |
| 3,524,677 | 8/1970 | Louton..................................297/216 |
| 3,424,494 | 1/1969 | McIntyre..............................297/385 |
| 2,127,610 | 8/1938 | Moore..............................297/344 X |
| 3,445,143 | 5/1969 | Swenson.............................248/429 |
| 3,207,554 | 9/1965 | Dall..................................297/385 |

*Primary Examiner*—Francis K. Zugel
*Attorney*—Waters, Roditi, Schwartz & Nissen

[57] ABSTRACT

A seat of a motor vehicle is longitudinally displaceable along guide rails at opposite sides of the seat and a clamping device is provided between the seat and guide rails to lock the seat in an adjusted position. The clamping device includes, on opposite sides of the seat, a pivotal plate on the seat frame with openings facing teeth on a flange of a guide rail. By operation of a lever, the plates are pivoted to release the clamping device, whereupon the seat can be adjusted after which the lever is released and the teeth are again engaged in the openings to lock the seat and rails. A safety belt is attached to the upper ends of the pivotal plates such that tensioning of the belt acts to engage the teeth in the openings.

10 Claims, 3 Drawing Figures

3,727,977

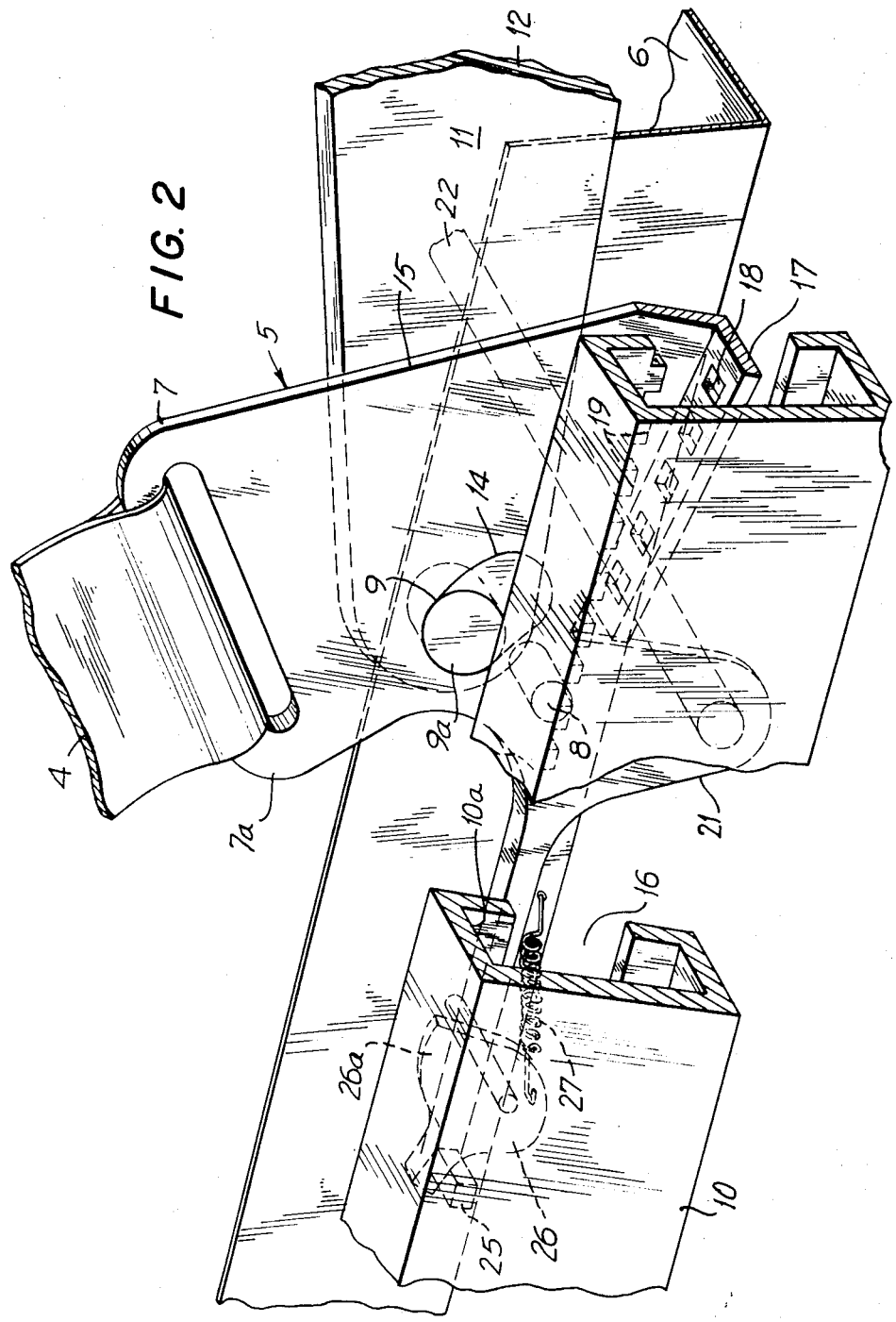

ATTACHMENT OF A SAFETY BELT FOR AN ADJUSTABLE SEAT OF A MOTOR VEHICLE

BRIEF SUMMARY OF THE INVENTION

The invention relates to the attachment of a safety belt to a seat which is longitudinally displaceable on a guide rail of a motor vehicle. The belt may be a shoulder or lap belt. The seat can be locked in various longitudinal positions by means of a clamping device comprising a first part on the seat disengageably cooperating with a second part on the guide rail.

The known attachment points for the safety belts are either on the components of the vehicle body (floor, sides, etc.) or directly on the seat. The attachment of the safety belt to the vehicle body is disadvantageous in that the length of the safety belt must be readjusted after each change in position of the seat. Moreover, because of the change in angle which the safety belt makes with respect to the direction of travel as a result of the readjustment, optimal position of the safety belt is not ensured. In order not to change the position of the safety belt in relation to the seated person while adjusting the position of the seat, or to change it only to a minimum extent, the attachment directly to the seat has proved to be most suitable. This known attachment of the safety belt, either a shoulder belt or a lap belt, to the seat frame or other rigid part of the seat brings about, however, the drawback that the conventional clamping devices for adjusting the position of the seat cannot sustain the large forces produced at the time of collision of the vehicle from the weight of the seat and the weight of the passenger. Moreover, disengagement of the clamping device becomes possible with the result that the passenger, together with the seat, may be thrown forwardly or backwardly in a collision and exposed to great bodily harm.

It is an object of the invention to provide an attachment of the safety belt such that a belt worn by a passenger, especially one sitting in the front seat, acts in the same optimal manner and direction in relation to him, independently of longitudinal adjustment of the seat.

According to the invention, this objective is achieved in that the ends of at least the lap belt are attached to the part of the clamping device attached to the seat and both parts of the clamping device cooperate in such a manner that the load applied to the ends of the safety belt during tensioning thereof acts in a direction to cause engagement of the parts of the clamping device.

The attachment according to the invention has the advantage that all the stresses applied to the seat are immediately transferred directly to the guide rail via the clamping device, and are resisted by the floor of the vehicle. Furthermore, the safety belt retains its comfortable position and optimum placement in relation to the seated passenger for all adjusted positions of the seat, and there is no need for readjustment of the length of the safety belt. An undesired disengagement of the clamping device becomes completely impossible.

There are known seat constructions, wherein guide rails of generally U-shape are arranged on both sides of the seat. For these constructions, the invention contemplates that the upper edge of each guiding rail be provided with a plurality of teeth which are directed downwardly. An engaging plate pivotably mounted on the seat includes a portion with holes facing these teeth and arranged to disengageably receive the teeth in a locked position of the seat and rails.

It is a feature of the invention that the clamping device will remain engaged with the frame of the seat even after it is subjected to substantial deformation. According to the invention, the engaging plate of each clamping device is mounted on the seat frame for pivotal movement about an axle somewhat below a swivel axle of the seat back to the frame, and the engaging plate has an opening receiving the swivel axle of the seat back, the opening being an elongated slot arranged such that the engaging plate engages the swivel axle at the end of said elongated slot in its engaged position.

This results in the additional advantageous feature, that the clamping device may be of simple construction due to the arrangement wherein the swivel axle of the seat back is carried therein.

The openings in the engaging plate have the form of completely surrounded holes and the engaging plate remains in firm contact with the guide rail after its seating. The openings are formed in an outwardly extending leg at the rear of the engaging plate facing the teeth and pivotal movement of the plate produces engagement and disengagement of the teeth in the openings. In this way, the guide rail itself is engaged in the load-carrying process.

BRIEF DESCRIPTION OF THE DRAWING

FIG. 2 is a schematic perspective view, partly broken away and in section, of the clamping device for the seat of FIG. 1, on a somewhat enlarged scale.

DETAILED DESCRIPTION

Figure 1:
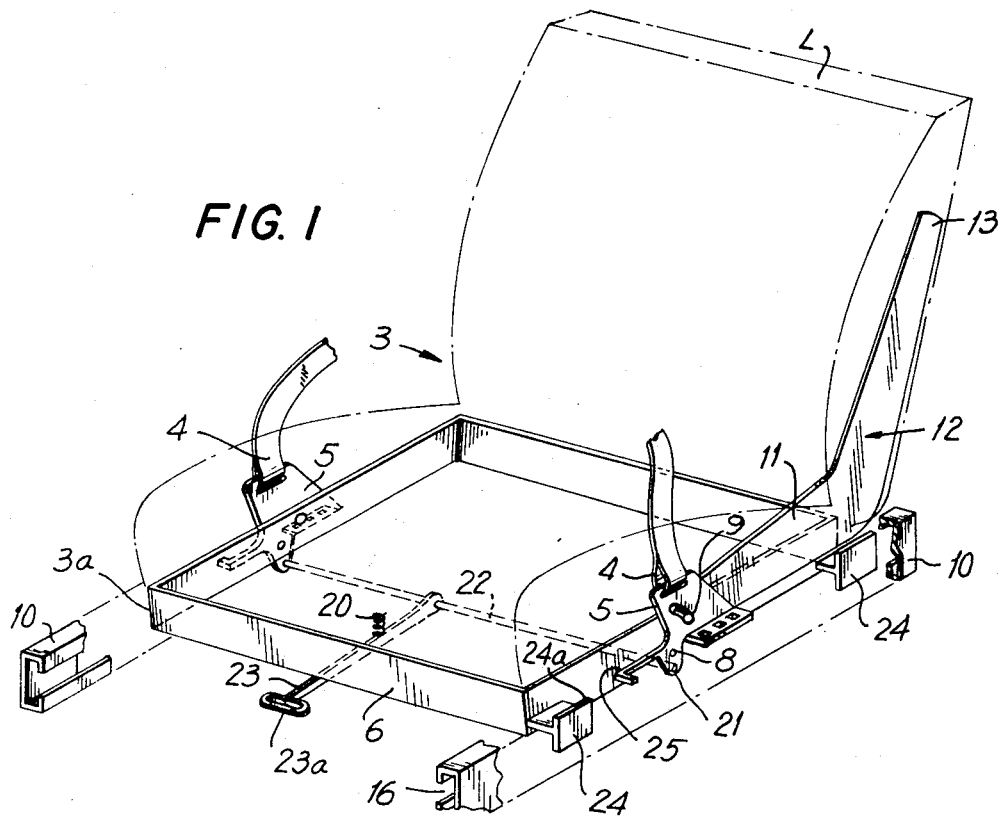
FIG. 1 is a diagrammatic perspective view showing a seat frame with one of the supports of a seat back and with both ends of a lap belt connected to a clamping device according to the invention.

Referring to FIG. 1 of the drawing, therein is shown a seat 3 of a motor vehicle which is mounted for longitudinal displacement forwardly and rearwardly on guide rails 10 fixedly secured to the vehicle. A lap safety belt is shown, by way of example, for holding a person in the seat particularly in the case of a collision or sudden stop.

Each end 4 of the lap belt is connected to a clamping device 5 which serves for locking the seat in position on the rails 10. The clamping device 5 comprises an engaging plate 7 which extends upwardly beyond the frame 6 of the seat 3, and the plate 7 has an upper end 7a at which an end 4 of the belt is secured.

The engaging plate 7 of the clamping device 5 is pivotably mounted on an axle 8 secured to the seat frame 6 and serves to lock or unlock the clamping device. The axle 8 is positioned slightly in front of and below a swivel bearing 9 of the seat back L on the seat frame 6. The engaging plate 7 of the clamping device 5 is mounted between the guide rail 10 and a horizontally protruding arm 11 of a seat back support 12 of angle shape.

The inclination of the seat back L can be altered with respect to the upright arm 13 of the support 12 in a known manner which is not shown. In order to be able to tilt the seat back L, by means of support 12, in the forward direction, the approximately horizontal arm 11 is pivotably mounted, at its front end which protrudes between the seat frame 6 and the engaging plate 7, on the axle 9a of the seat back swivel bearing 9. For this reason, the swivel axle 9a extends into a slot 14 in the plate 7 of the clamping device 5. In unlocked position, the plate 7 of the clamping device rests, after a corresponding displacement, on the axle 9a which will therefore serve as a stop for the pivotal movement of plate 7. The slot 14 is disposed above the axle 8 of the clamping device 5, and is slightly inclined downwardly and towards the rear end, to permit the engaging plate to pivot about the axle 8 in order to render possible engagement or disengagement of the clamping device 5 and thus locking of the seat 3 or freeing it for longitudinal displacement along the rails 10.

At the lower rear portion of the engaging plate 7, starting approximately at the longitudinal position of the seat back swivel bearing 9, an outwardly bent leg 17 is formed and is provided with openings 18 at approximately the elevation of the axle 8. The leg 17 extends into the space 16 between the facing flanges of the C-shaped open guide rail 10. The upper flange of the rail 10 is formed with a plurality of teeth 19 adapted to penetrate into the openings 18 in the leg 17 when the clamping device 5 locks the seat to the rail 10. The teeth 19 extend from the upper flange of the guiding rails 10 downwardly. The engagement of the teeth 19 in the openings 18 is achieved by the force of a prestressed spring 20, which permanently urges the engaging plate 7 in counterclockwise direction about axle 8 and thus applies the leg 17 against the upper flange of the guide rails 10.

In order to permit longitudinal displacement of the seat 3 to a new position, the clamping device 5 must be disengaged, i.e., the teeth 19 must be freed from the openings 18 in leg 17 of engaging plate 7. This is achieved by pivoting the engaging plate 7 clockwise about axle 8 in opposition to spring 20. For this purpose, each plate 7 is provided with a projection 21 generally forwards of the respective axle 8 and below it, said projections 21 being displaceable between respective rails 10 and seat frame 6. A connecting shaft 22 is fastened to the lower end of each projection 21 and is secured to a lever 23 which projects forwardly at the lower front edge of the seat 3. The lever 23 may be lifted upwardly by means of a handle 23a, in order to release the engagement of the teeth 19 in the openings 18 whereby the seat 3 is unlocked. The spring 20 acts on lever 23 to resist disengagement of teeth 19 from openings 18 but the spring could be fastened directly to the engaging plate 7 or to any other suitable point.

Figure 2A:
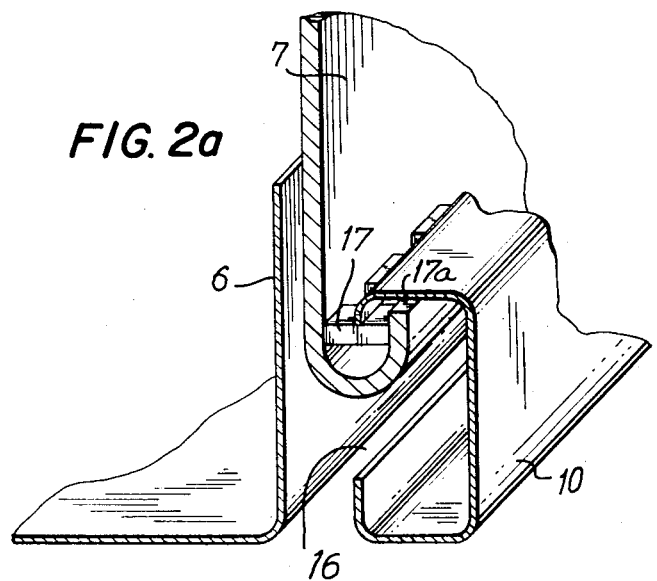
FIG. 2a is a perspective view of a modified arrangement of the engaging plate of the clamping device of FIG. 2.

The guide rails 10 and the clamping devices 5 remain in engagement when the belt is loaded, i.e., when the belt is tensioned, such loading tending to increase the engagement of the teeth in the openings. In order to avoid the danger of shearing through the holes 18, the free edge 17a of the leg 17 can be formed with an upwardly bent lip as shown in FIG. 2a in such a manner that the lip is a constant distance from the engaging plate 7, and is positioned somewhat below the inner surface 10a of the guide rails when the clamping device is locked. Hereby, the engagement of the teeth 19 of the guide rail 10 in the engaging plate 7 is additionally ensured.

After the disengagement of the clamping device 5, the seat 3 can be longitudinally displaced to a new position by sliding of slides 24 attached to the seat frame, in the guide rails. In order to facilitate sliding of slides 24 they are furnished with plastic runner strips 24a at their top and bottom surfaces. The engaging plate 7 can be provided with a hook portion 25 which extends forwardly approximately at the level of the axle 8 of the plate 7 for pivoting a cam 26 in the direction opposite to the action of a spring 27, acting thereon. The force of spring 27 is substantially smaller than the force of the spring 20, but is sufficient to press wedge surface 26a of the cam 26 against the inner surface 10a of the guide rail 10 so that the seat frame is normally clamped to the rail 10 to prevent rattling in the system.

The connecting shaft 22 may be connected to one of the clamping devices via a slot in the plate 7 such that they are disengaged simultaneously, whereas one clamping device can engage again without engagement of the other. In this manner, there is obtained the possibility that the first clamping device can be securely engaged, even though the teeth and openings of the other are not aligned. The other clamping device subsequently engages, when the seat moves slightly as a result of movement of the passengers.

What is claimed is:

1. Attachment apparatus for a seat belt on a seat which is longitudinally displaceable on a guide rail, said apparatus comprising clamping means for locking the seat to the rail and including a first part secured to the seat and a second part secured to the rail, said parts being engaged when the seat is locked to the rail, and means connecting the belt to said first part in a position such that tension in the belt acts to engage said first and second parts, said second part comprising a flange on said rail and a plurality of teeth on said flange, said first part comprising a pivotal plate provided with a succession of openings in facing relation with said teeth for being engaged therewith upon pivotal movement of said of said plate to lock the seat to the rail, said rail being of C-shape and said plate including an outwardly projecting leg with said openings therein, said leg fitting in said rail for free passage during displacement of the seat, said plate including a downward projection and means engaging said projection for pivotably moving said plate to engage and disengage the teeth in said openings, a pivotal spring-loaded cam means between the rail and frame holding the same together to prevent rattling, and a hook portion on said plate facing said cam means to release the same when the clamping means is unlocked.

2. Apparatus as claimed in claim 1 wherein said openings in said first part are constituted as completely surrounded holes.

3. Apparatus as claimed in claim 1 wherein said teeth protrude downwardly from said flange and said openings in the plate are below the teeth, said plate including an attachment portion for said belt which under tension in the belt produces pivotal movement of the plate to cause the teeth to engage in the openings.

4. Apparatus as claimed in claim 1 wherein said plate includes an outwardly projecting leg with said openings therein, said leg having a free edge with an upturned lip thereon extending parallel to said plate and having an edge lying in spaced relation from said rail when the teeth are engaged in said openings.

5. Apparatus as claimed in claim 1 wherein a guide rail is provided an opposite sides of the seat, and a clamping means is provided between each rail and the seat, said means for pivotably moving said plate comprising a connecting shaft joined to the projection on the plates of both clamping means, and a lever connected to and extending perpendicularly to said connecting shaft and projecting forwardly of the seat at the bottom thereof for being pivotably moved to pivotably move the plates.

6. Apparatus as claimed in claim 9 comprising a spring means acting on said lever to bias the same and urge the plates to positions in which the teeth engage in the openings.

7. Attachment apparatus for a seat belt on a seat which is longitudinally displaceable on a guide rail, said seat including a frame, a back, and a swivel pin pivotably connecting the back to the frame, said apparatus comprising clamping means for locking the seat to the rail and including a first part pivotably connected to said frame and having a slot in which the swivel pin is engaged and a second part secured to the rail, said parts being engaged when the seat is locked to the rail, and means connecting the belt to said first part in a position such that tension in the belt acts to engage said first and second parts.

8. Apparatus as claimed in claim 7 wherein said first part comprises a plate including a portion extending upwardly of said swivel pin and connected to said belt.

9. Apparatus as claimed in claim 8 wherein said plate has a pivot axis to said frame at a level below said swivel pin, said plate including an outwardly projecting leg rearward of the swivel pin approximately at the level of said pivot axis.

10. Apparatus as claimed in claim 9 wherein said plate includes a downward projection below said pivot axis and forward of said outwardly projecting leg by which pivotal movement can be imparted to said plate.

* * * * *